United States Patent [19]
Batten

[11] Patent Number: 5,759,041
[45] Date of Patent: Jun. 2, 1998

[54] MATHEMATICS TEACHING DEVICE

[76] Inventor: Brenda R. Batten, RR 1, Box 692, Corinth, Vt. 05039

[21] Appl. No.: 840,195

[22] Filed: Apr. 11, 1997

[51] Int. Cl.⁶ .................................... G09B 1/16
[52] U.S. Cl. .................. 434/209; 434/191; 434/345; 434/347
[58] Field of Search .................. 434/188, 191, 434/209, 347, 345, 322

[56] References Cited

U.S. PATENT DOCUMENTS 1,400,887  12/1921  Liebman .
2,769,640  11/1956  Elder .
3,456,364  7/1969  Alexander ................. 434/209
3,735,504  5/1973  Fedyna ..................... 434/209
4,445,865  5/1984  Sellon ...................... 434/207

*Primary Examiner*—Jeffrey A. Smith
*Attorney, Agent, or Firm*—Kevin Ellicott, Esq.

[57] ABSTRACT

A multiplication table teaching device having a body, the body having a front side and a back side, the front side having 55 multiplication problems located thereon and the back side having located thereon 55 answers corresponding to the multiplication problems located on the front side, the body having 55 body holes permitting the passage therethrough from the front side and the back side.

1 Claim, 1 Drawing Sheet

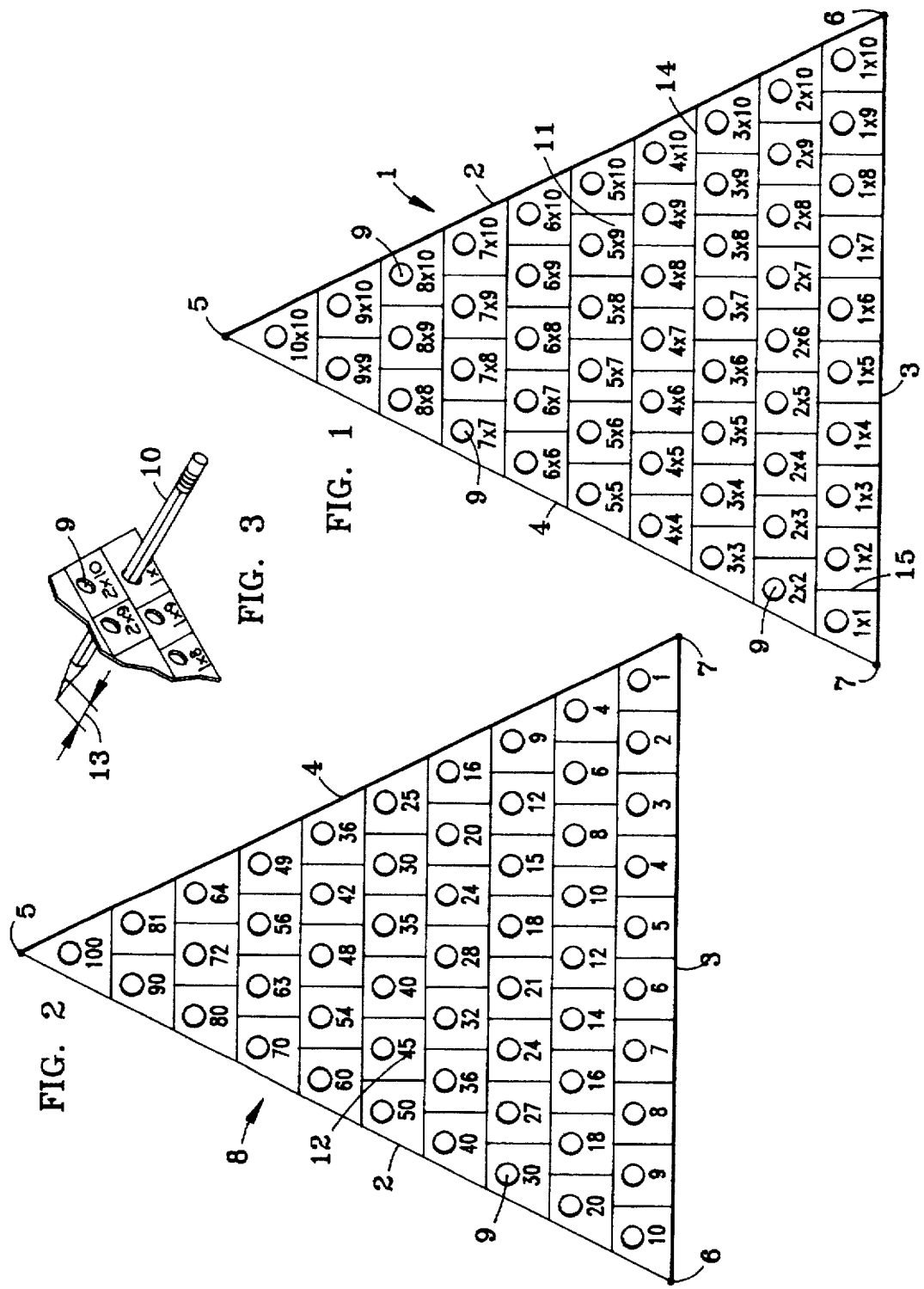

MATHEMATICS TEACHING DEVICE

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of devices consisting of articles of manufacture known as educational devices, more specifically, mathematics teaching tools and devices.

2. Background Information

The prior art known to applicant discloses that mathematics teaching devices, in particular those intended to teach "times tables" or multiplication tables, are well known. These devices usually involve an article upon which the multiplication tables are reproduced in their entirety, and require the student using the device to "cross reference" one number against another, and note the product of those two numbers (for example, Sellon, U.S. Pat. No. 4,445,865 and Liebman, U.S. Pat. No. 1,400,887). In another manifestation known to Applicant, a "card game" utilizes cards having printed thereon a grid containing only some of the products of numbers between 0 and 10 (Elder, U.S. Pat. No. 2,769, 640).

All of the devices known to Applicant rely upon the same basic premise; that the student using the device locate, through cross reference, the product of two numbers. In each device, the numbers are arranged in a grid pattern, and the student is expected to follow one number across, horizontally (an "X" axis) and another number down, vertically (a "Y" axis), to locate the answer (product) of the problem posed. In one manifestation, this process involves the use of wooden (or similar material) pegs which are place at the location of the numbers for which a product is sought, while a third peg is then placed at the intersection of the two numbers, which is the product. Another manifestation substitutes transparent material strips for the pegs, and locates the product at the place where the two strips cross one another, the answer being visibly apparent through the two strips.

Unfortunately, these devices and their methods of use all require that the user of the device be looking at the device, with the answer readily apparent, during the process of determining an answer to the problem posed. There is, by the very design of these devices, a built in encouragement to "cheat" and disclose the answer without having actually thought about it.

In each case, the prior art presents the answer, to the student, prior to the student's giving any thought to the answer. As the student views the "grid" he or she will also be viewing the answer. Instead of encouraging the student to memorize the particular answer to the problem, the student is encouraged to simply look at the answer without giving it any thought. Even the most dedicated student will find it difficult to ignore the immediate presentment of the answer to a problem, when that answer is directly in view in the vicinity of the problem posed. The net result of this premature presentment of the answer is that the student learns how to quickly look across and down a grid, rather than learning to remember the product of two numbers. These devices train the student to recognize rather than memorize, the answer.

Furthermore, use of a device such as the card game entails not only the difficulty of presenting the answer to the problem right alongside the problem itself, but because it involves a plurality of cards, each having different problems and answers, makes repeating particular areas of difficulty all the more problematic.

Finally, the prior art presents the "times tables" in their entirety, including repetition of the numbers for which a product is sought. This repetition occurs due to the fact that each pair of numbers for which a product is sought will have a mirror image analogue. For example, the formula "5×4= 20" is simply the mirror image of the formula "4×5=20" (transposition). A student viewing devices constructed in this manner is likely to perceive the tables as being unwieldy, and overly burdensome to memorize. After all, there appear to be twice as many sets of formulas to memorize. Hence, the redundancy inherent in these devices by their nature creates a strong disincentive to mastering the times tables.

SUMMARY OF THE INVENTION

The instant invention is a novel and useful device for the teaching of mathematics. The primary function of the device is to aid students in the memorization of what are commonly referred to as "times tables" or "multiplication tables". In addition, the device is amenable to configurations which would present mathematical operations including division, addition and subtraction, as well as others.

The instant invention accomplishes its purpose by presenting to the student a vastly simplified multiplication table wherein all redundancy due to transposition is deleted. The multiplication table is expressed on a body means having means for passing through the front side and the back side. In the preferred embodiment, the means for passing through the front side and the back side are 55 body holes. On the front side of the body means, the problems (e.g. "4×6") are set out. Each problem has in close proximity, a body hole. On the back side of the body means, the corresponding answer to each problem is set out. The body hole associated with a particular problem is also associated with that problem's corresponding answer. The body hole of the front side of the body means is continuous with the corresponding body hole on the back side of the body means.

A student (or students) utilizes the device by first locating on the front side of the body means a problem which he or she desires to solve. Having decided what the possible answer is, the student then places the tip of a pencil (or other instrument having a diameter of less than the body hole) through the body hole. The student then inverts (flips the device over, such that the back side of the device now faces the student) the device, and notes through which body hole the pencil tip protrudes on the opposite side. Because the location of the particular body hole is in close proximity to the answer, the student can quickly observe the answer so presented, and determine whether his or her answer in fact corresponds to the correct answer.

Another variation of the device's use entails first selecting an answer on the back side of the body means, placing the tip of the pencil through the associated body hole, then inverting the device to reveal what two numbers may be multiplied together to produce the result so chosen.

Still another variation of the device's use entails a "teacher" or other such person calling off either a product, or a pair of numbers which are to be multiplied together, and a student or group of students placing their pencil tip(s) through the required body hole, turning the device over, and noting the corresponding answer.

In another variation of the device, the back side of the body means may have, in addition to the answers to the problems set out on the front side, a simple graphical element in association with each answer. Non-limiting examples of such simple graphical elements include a "ball", a "kite", a "squirrel" and a "guitar". The Inventor believes that such graphical elements will be of assistance in memorizing the answers due to the process of association.

The instant invention overcomes a number of problems found within the prior art and constitutes a significant departure from that art on a number of counts.

First, the instant invention is physically constructed such that only the answer, or the problem, may be viewed at any moment. This is extremely important given the prior art's failure to address the issue of "cheating". In the prior art, the student is presented both the problem and the answer in close proximity to one another. Even if the student is intentionally trying to avoid seeing the answer until after having given some thought to the problem, the answer's visual presence is difficult to avoid. The Applicant has overcome this failing in the prior art by locating the problems and the answers to those problems on opposite sides of the body means. In so doing, the student is prevented from looking at the answer prior to having thought about a potential answer, and is forced to formulate a potential answer on his or her own. The student cannot see the answer to the problem without actively interacting with the device. This aids not only in the process of rote memorization of the multiplication tables, but provides the opportunity for the student to experience the satisfaction which often accompanies completing a task on one's own without recourse to cheating. In short, Applicant's device removes the opportunity for cheating which is present throughout the prior art by requiring the student to actively interact with the device, rather than engaging in simple visual cross referencing.

Second, rote memorization of the sort required to master the multiplication tables is best assisted through repetition. Applicant's device breaks with the prior art by providing a means for quickly and easily locating and repeating those problems with which the student seems to be having the most difficulty. This is especially true in prior art examples such as the "card game" noted earlier. The problems found on Applicant's device are presented in a logical format, and are easily locatable. The problems in devices such as the card game are widely spread over a number of cards, making the repetition of only selected problems more difficult. With Applicant's device, once the student has determined which problems are elusive to him or her, it is far simpler to locate those problems on the front side of the device than to search through the deck of cards and locate only those cards on which the difficult problem exists. Applicant believes that a student who has memorized all but a few answers will find Applicant's device a far more simple, and enjoyable, device with which to interact while learning the remaining problems.

Third, Applicant's device offers the student a means for vastly simplifying the material which must be learned in order to master the multiplication tables. Unlike the prior art, wherein both the problem, and the problem's transposition are presented, Applicant's device includes those problems only once, each. Applicant believes that such a presentation will help alleviate the feeling of being "overwhelmed" which often accompanies the learning of multiplication tables. In Applicant's device, it is readily apparent that there are a manageable number of problems which the student will need to memorize in order to master the tables. These problems are further presented, in a two dimensional pyramidal or triangular structure, thereby more clearly demonstrating the relationships amongst the problems, and the overall structure of the tables themselves. A student viewing, for example, the multiplication table for the number "9" will quickly realize that all possible combinations of numbers between 1 and 10, other than "9×9" and "9×10" have already been learned in the preceding tables (e.g. the tables corresponding to the numbers 1 through 8).

Finally, Applicant's device is interactive and easy to use. Rather than forcing the student to manipulate plastic strips, or pegs, or plastic discs, the student need only have a writing instrument such as a pencil or pen handy. The student locates the particular problems which need additional repetition, places the pencil tip through that problem's body hole, and after concluding what the answer is, inverts (flips over) the device to reveal the correct answer. This provides both a challenge to the student, and ease in locating the proper answer (by simply noting through which body hole the pencil tip protrudes, and noting the associated answer). Unlike much of the prior art, the student is not required to cart about and keep track of many small, easily lost parts. Furthermore, unlike much of the prior art which presents the answer along with the question, Applicant's invention requires the student to interact with the device (by placing the pencil tip through the body hole and inverting the device) before seeing the answer. This in turn serves as further impetus to continue interacting with the device without becoming bored.

A DESCRIPTION OF THE DRAWINGS

FIG. 1 is a plan view of the mathematics teaching device body means front side.

FIG. 2 is a plan view of the mathematics teaching device body means back side.

FIG. 3 is a perspective partial view of the mathematics teaching device in use.

A DESCRIPTION OF THE PREFERRED EMBODIMENT

As per FIG. 1, a mathematics teaching device body means front side 1 is disclosed. The preferred embodiment of the mathematics teaching device is configured in the shape of a triangle, having a first peripheral edge 2, a second peripheral edge 3 and a third peripheral edge 4. From a first point 5, the first peripheral edge extends to a second point 6. The second peripheral edge 2 then extends, at angle obtuse to the first peripheral edge, from the second point 6 to a third point 7. The third peripheral edge 4 then extends, at an angle obtuse to the second peripheral edge, from the third point 7 to the first point 5. The first peripheral edge 2, second peripheral edge 3 and third peripheral edge 4 define the outermost boundary of the mathematics teaching device body means front side 1.

As per FIG. 2, a mathematics teaching device body means back side 8 is disclosed. The mathematics teaching device body means having a first peripheral edge 2, a second peripheral edge 3 and a third peripheral edge 4. The mathematics teaching device body means back side first peripheral edge 2 being coextensive with the mathematics teaching device body means front side first peripheral edge 2; the mathematics teaching device body means back side second peripheral edge 3 being coextensive with the mathematics teaching device body means front side second peripheral edge 3; and the mathematics teaching device body means back side third peripheral edge 4 being coextensive with the mathematics teaching device body means front side third peripheral edge 4. The first peripheral edge 2, second peripheral edge 3 and third peripheral edge 4 define the outermost boundary of the mathematics teaching device body means back side 8.

Naturally, the mathematics teaching device is in actuality a three dimensional object, and therefore the first peripheral edge 2, second peripheral edge 3 and third peripheral edge 4 must have a third dimension, thickness, which is not shown. However, this peripheral edge thickness is entirely dependent upon the material chosen to form the mathematics teaching device body means, and is limited only by the that thickness necessary to maintain the mathematics teaching device body means substantially rigid such that when using the mathematics teaching device, any bending or flexing of it is not so great as to obscure the formulas from view. In the preferred embodiment, the mathematics teaching device is constructed of a substantially rigid plastic or wood, and is approximately one eighth of one inch thick.

As per FIGS. 1 and 2, the mathematics teaching device body means has body holes 9 passing therethrough, perpendicular to a plane which is coplanar with the mathematics teaching device body means front side 1 and back side 8. In the preferred embodiment, each body hole 9 is circular in shape and has body hole diameter, body hole diameter being the distance between two imaginary points situated in diametric opposition along the circumference of the body hole, the circumference being parallel to the plane coplanar to the mathematics teaching device body means front side. In the preferred embodiment, the diameter of each body hole 9 is approximately one quarter of one inch. Each body hole 9 on the mathematics teaching device front side is coextensive with a corresponding body hole 9 on the mathematics teaching device back side, such that when a pointed instrument such as a pencil is thrust into the body hole on the mathematics teaching device body means front side, is protrudes out of the corresponding body hole on the mathematics device body means back side 8.

It should be clear given the three dimensional nature of the device that each body hole has a bore passing through the mathematics teaching device body means, from the surface of the mathematics teaching tool body means front side, to the surface of the mathematics teaching tool body means back side. The length of this bore corresponds to the thickness of the mathematics teaching tool body means itself, and in the preferred embodiment is approximately one eighth of one inch.

As per FIGS. 1, 2 and 3, the mathematics teaching tool body means front side 1 and back side 2 has located thereon a series of mathematics problems 11 and solutions 12. Each mathematics problem 11 is situated on the mathematics teaching tool body means front side 1, and located in close proximity to its corresponding body hole 9 such that when a pointed instrument 10 is thrust into the body hole 9 on the mathematics teaching tool body means front side 1, it protrudes out of the mathematics teaching tool body means back side from the body hole 9 in close proximity to the corresponding answer to the problem so chosen.

As per FIGS. 1, 2 and 3, the pointed instrument 10 is utilized to locate the answer to a particular problem. This pointed instrument can be any instrument having a diameter at a point section 13 of less than the diameter of the body hole, the length of the point section 13 being sufficiently long to extend through the mathematics teaching tool body means front side 1, through the body hole 9 and body hole bore, and protrude through the mathematics teaching tool body means back side 8. In the preferred embodiment, the pointed instrument is a sharpened pencil.

In the preferred embodiment, there are 55 body holes, 55 problems and 55 answers to those problems. Furthermore, the problems 11 and the answers 12 located on the mathematics body means front side 1 and back side 8 may be more clearly separated from one another by interposing a series of horizontal lines 14 (parallel to the second peripheral edge 3), and separating each problem/answer by interposing a series of vertical lines 15, the vertical lines being perpendicular to the horizontal lines 14. Additionally, Applicant believes the best mode of the device would configure the presentation of the problems 11 and the answers 12 in an ascending hierarchical pattern, having the table for the prime numbers of 1 through 10 being multiplied by the number 1 along the section of the body means most proximate to peripheral edge 3, with the table for the prime numbers of 2 through 10 being multiplied by the number two (and not including any repetition of numbers which had already been multiplied by one another in the preceding table) placed parallel to the preceding table, more proximate to the first point 5 than was the preceding table. This pattern would continue until the final table, having only the multiplication of the number 10 by the number 10, was placed in close proximity to the first point 5. As should now be clear, when the device is used as a tool for teaching multiplication tables, there will be one less problem/answer in each table than in the table which precedes it, where precedes means being of lesser numerical value (e.g. 3 is of lesser numerical value than 4, and 4 is of lesser numerical value than 5).

As per FIGS. 1, 2, and 3, the mathematics teaching device is utilized by a student (or anyone else desiring to learn mathematics through interaction with the device) by first determining which of the problems 11 (or answers 12) the student wishes to solve. The student then, after having decided what the appropriate answer 12 (or problem 11) should be, places the point section 13 of the pointed instrument 10 into that problem's (or answer's) corresponding body hole 9. Finally, the student inverts the device, the pointed instrument's point section 13 being maintained in the body hole 9 in which it was placed, and notes which answer (or problem) is in close proximity to the body hole 9 from which the point section 13 of the pointed instrument protrudes.

I claim:

1. A multiplication teaching tool comprising:
    A. a triangular body means,
        I. the triangular body means having a front side,
            a. the front side having imprinted thereon 55 multiplication problems,
                i. the 55 multiplication problems being ordered such that the problems 1×1 through 1×10 are in a series, adjacent to one another,
                ii. the 55 multiplication problems being ordered such that the problems 2×2 through 2×10 are in a series, with no problem repeated, adjacent to one another, and adjacent to the problems 1×1 through 1×10,
                iii. the 55 multiplication problems being ordered such that the problems 3×3 through 3×10 are in a series, with no problem repeated, adjacent to one another and adjacent to the problems 2×2 through 2×10.
  iv. the 55 multiplication problems being ordered such that the problems 4×4 through 4×10 are in a series, with no problem repeated, adjacent to one another and adjacent to the problems 3×3 through 3×10.
  v. the 55 multiplication problems being ordered such that the problems 5×5 through 5×10 are in a series, with no problem repeated, adjacent to one another and adjacent to the problems 4×4 through 4×10.
  vi. the 55 multiplication problems being ordered such that the problems 6×6 through 6×10 are in a series, with no problem repeated, adjacent to one another and adjacent to the problems 5×5 through 5×10.
  vi. the 55 multiplication problems being ordered such that the problems 7×7 through 7×10 are in a series, with no problem repeated, adjacent to one another and adjacent to the problems 6×6 through 6×10.
  viii. the 55 multiplication problems being ordered such that the problems 8×6 through 8×10 are in a series, with no problem repeated, adjacent to one another and adjacent to the problems 7×7 through 7×10.
  ix. the 55 multiplication problems being ordered such that the problems 9×9 through 9×10 are in a series, with no problem repeated, adjacent to one another and adjacent to the problems 8×8 through 8×10.
  x. the 55 multiplication problems being ordered such that the problem 10×10 is adjacent to the problems 9×9 through 9×10.
II. the triangular body means having a back side.
  a. the back side having imprinted thereon, 55 multiplication answers.
    i. the 55 multiplication answers corresponding to the 55 multiplication problems.
III. the triangular body means having a peripheral edge connecting the back side and the front side.
  a. the peripheral edge having peripheral edge width.
IV. the triangular body means being defined by a first point.
V. the triangular body means being defined by a first peripheral edge extending from the first point.
VI. the triangular body means being defined by a second point.
  a. the first peripheral edge merging into the second point.
VII. the triangular body means being defined by a second peripheral edge.
  a. the second peripheral edge extending from the second point.
  b. the second peripheral edge being at an acute angle to the first peripheral edge.
VIII. the triangular body means being defined by a third point.
  a. the second peripheral edge merging into the third point.
IX. the triangular body means being defined by a third peripheral edge.
  a. the third peripheral edge extending from the third point.
  b. the third peripheral edge being at an acute angle to the second peripheral edge.
  c. the third peripheral edge merging into the first point.
X. the triangular body means having body means thickness.
XI. the triangular body means having 55 body holes for passing through the front side and the back side.
  a. the 55 body holes each having body hole diameter.
  b. the 55 body holes each having a body hole bore.
    i. the body hole bore having a length equal to the triangular body means thickness.
    ii. the body holes each being in close proximity to a corresponding multiplication problem and that multiplication problem's corresponding answer, the body holes each having hole bore, the hole bore having hole bore diameter and hole bore depth, the hole bore depth and hole bore diameter being of sufficient dimensions so as to permit the passage therethrough of a pointed instrument.

* * * * *